Oct. 13, 1942. G. R. EGO 2,298,553
CONSTANT HEIGHT LIFT FOR PLOWS
Filed Jan. 2, 1941 2 Sheets-Sheet 1

INVENTOR
GEORGE ROSS EGO
BY A.S.Krob
ATTORNEY

Oct. 13, 1942.    G. R. EGO    2,298,553
CONSTANT HEIGHT LIFT FOR PLOWS
Filed Jan. 2, 1941    2 Sheets-Sheet 2
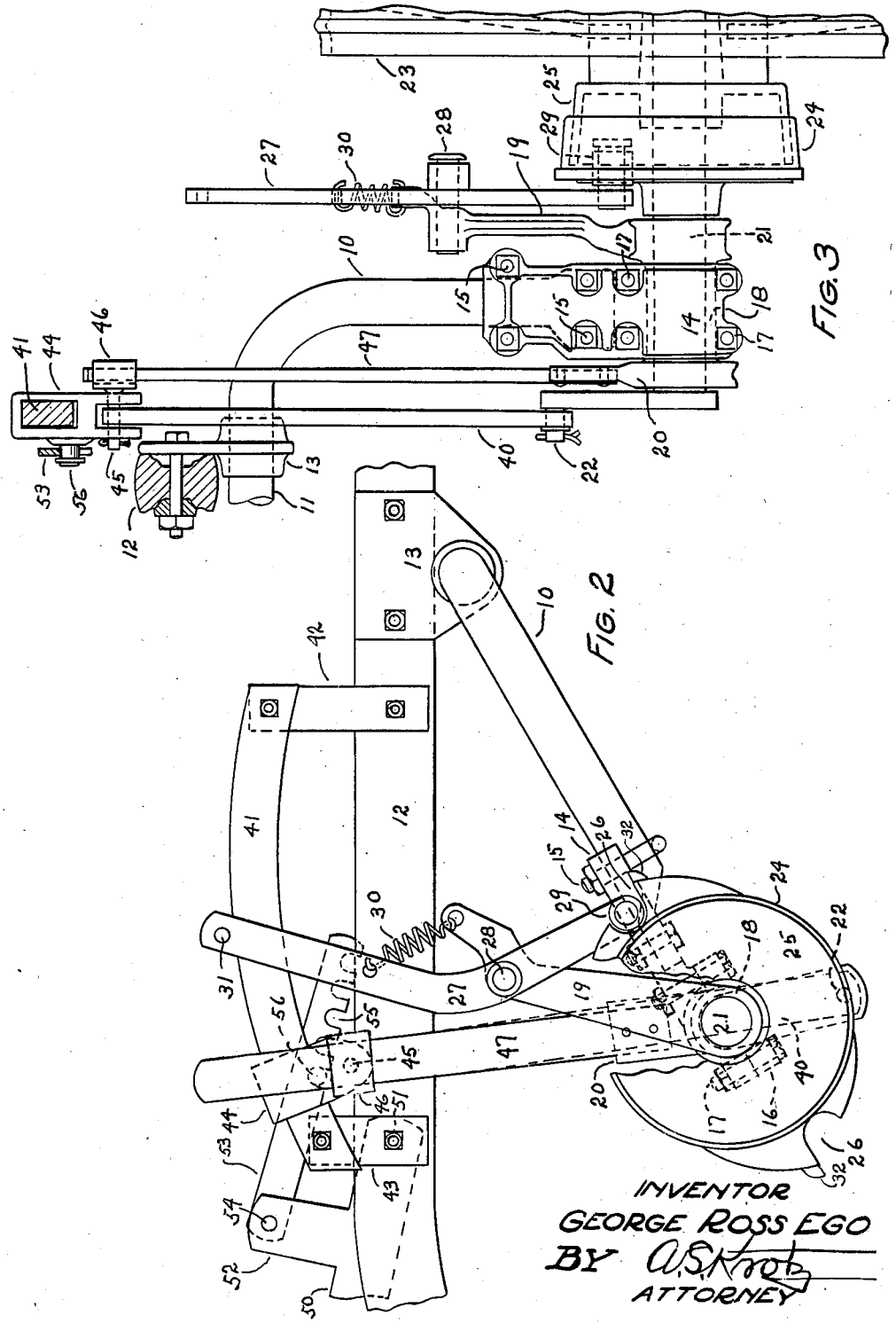
INVENTOR
GEORGE ROSS EGO
BY *A.S.Krol*
ATTORNEY Patented Oct. 13, 1942

2,298,553

UNITED STATES PATENT OFFICE 2,298,553

CONSTANT HEIGHT LIFT FOR PLOWS

George Ross Ego, Brantford, Ontario, Canada, assignor to Massey-Harris Company Ltd., Toronto, Ontario, Canada, a limited company of Canada Application January 2, 1941, Serial No. 372,722

4 Claims. (Cl. 97—73)

The present invention relates principally to tractor drawn plows and has for its object providing power lifting and depth regulating means which cooperate to provide a constant lift regardless of the depth of the ground working means.

In conventional plows, the depth plowed ranges from two to eight or ten inches. The power lifting device range is determined by the crank which is turned by the ground wheel, the range of which is seldom more than ten or twelve inches. Obviously without some means to control the maximum lift as in the present invention, there will be times when the plow will be scarcely lifted above the surface of the ground. In this position, it would collect trash and cause considerable trouble and delay.

In the present invention, I provide a depth lever having means between it and the crank which does not influence the lowest position of the wheels when the plow is out of the ground but does change the position of the wheels when in an operating position. That is, the lever acts to change the depth plowed but does not effect the lifted position of the plow.

Another object of the present invention is to provide a convenient adjustment between the depth lever and the lifting mechanism whereby the lever movement may be limited or the lever conveniently positioned throughout the entire range of depth plowed.

An important object of the present invention is to provide a plow of the class which is simple, light and strong and which is easily understood and operated.

To these and other useful ends, my invention consists of parts, combinations of parts, or their equivalents, and mode of operation, as hereinafter set forth and claimed and shown in the accompanying drawings in which:

Fig. 2 is a fractional side elevational view of the device shown in Figure 1, illustrating the plow in its operating position, the lever being set and connected for shallow plowing.

Fig. 3 is a fractional front elevational view of the device illustrated in Figures 1 and 2 wherein the plow is in its lifted position, with the crank in its uppermost position relative to the ground wheel.

Figure 1:
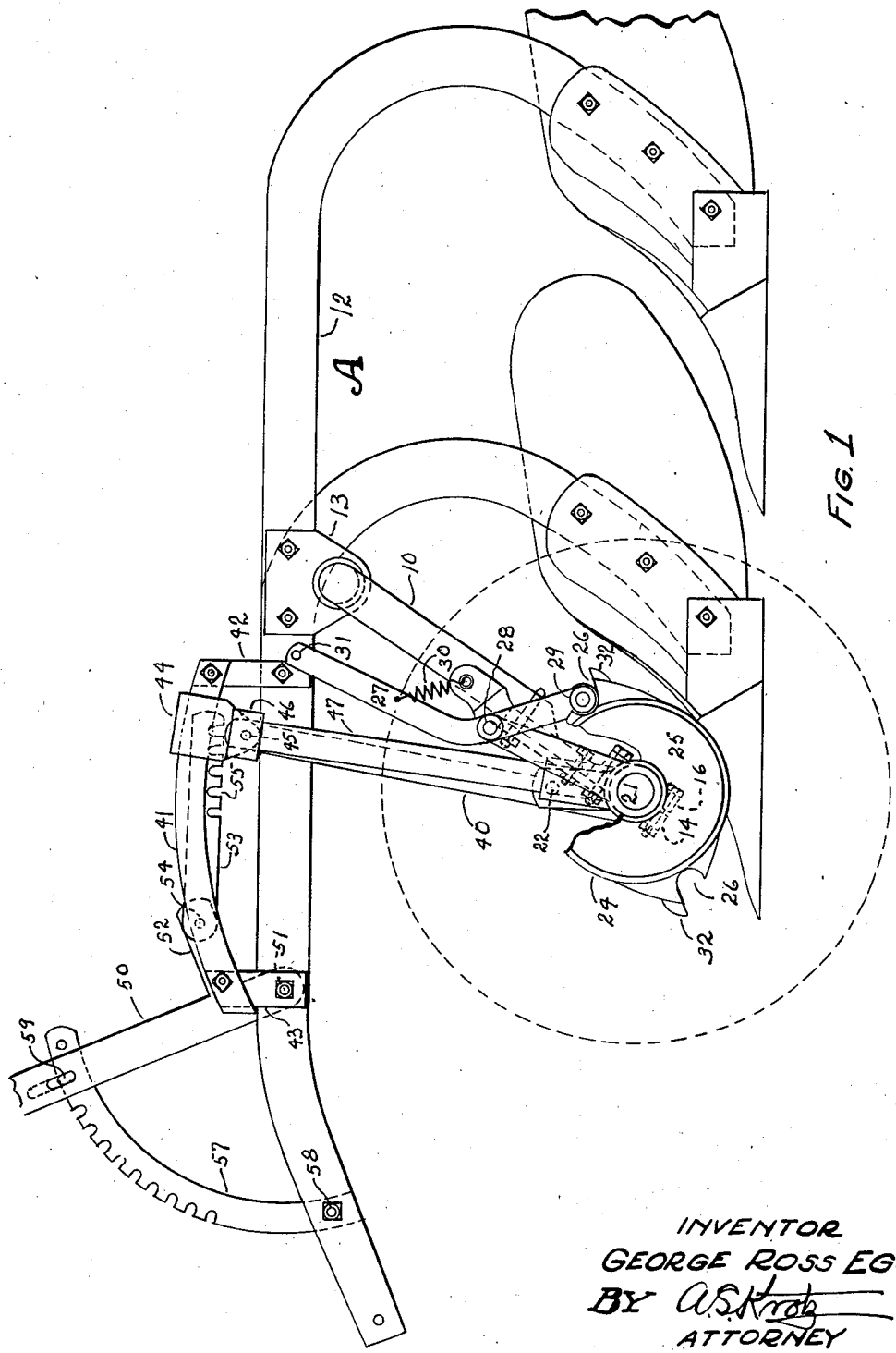
Fig. 1 is a fractional side elevational view of a plow equipped with my invention and illustrating the plow in its lifted position.

As thus illustrated, I have shown fractionally a two bottom plow, the bottoms and beams being designated in their entireties by reference character A. Plows of this class are provided with hitching devices at the front ends of the beams (not shown) suitable for connection to the draw bar of a tractor and the depth lever is made to extend so as to lie within reach of the operator of the tractor. Cranked axles are provided with transversely extending axle members upon which the furrow and land wheels are rotatably mounted.

In the figures, the land wheel axle is designated by reference numeral 10. The horizontal part 11 of the axle is pivotally mounted on the land side beam 12 by means of a bracket 13. A similar bracket (not shown) rotatably carries the furrow end of member 11 and is secured to the furrow side beam (not shown).

As is the custom in plows of the class, the furrow side cranked axle is hingedly secured to the beams similar to the land side axle and carries a ground wheel which is adapted to travel in the furrow. The design of this part of the plow and the connections between the two axles are too well known to require further description, particularly since the present invention relates exclusively to the power lifting clutch and its connection to the depth lever.

On the forward end of member 10, I mount a bracket 14 which is suitably secured by means of bolts 15, as illustrated. This bracket is provided on its under side with a cap 16 which is held to bracket 14 by means of bolts 17, forming an opening into which a sleeve 18 is rotatably mounted. Sleeve 18 has at its outer end a clutch arm 19 and an arm 20 on its inner end. The arms and sleeve are preferably made integral, as shown.

A stub shaft 21 is rotatably mounted in sleeve 18 and has on its inner end a crank member 22 and on its outer end a rotatably mounted ground wheel 23 and an inner clutch member 24, this member being keyed to member 21.

Member 25 of the clutch comprises preferably an internally toothed annular member, the outer end of which is secured to the hub of wheel 23. Member 24 is provided with interlocking means whereby members 24 and 25 may be locked together. This interlocking means may be operated manually so each time the operating lever is pulled, crank 22 will be caused to move one half turn. This part of the power lift device, as applied to implements, is too well known to require further description except to point out that member 24 is provided with oppositely positioned depressions 26—26 and that the clutch operating lever 27 is pivotally mounted to bracket 19 as at 28.

Lever 27 is provided with a rotatably mounted roller 29 on its lower end. A spring 30 is provided which urges this roller forwardly into depressions 26. Thus, normally when roller 29 is in one of the depressions, the means which interlock members 24 and 25 together are disconnected so the wheel is free to turn and member 22 is held stationary in either its upper or lower position.

The upper end of member 27 is provided with an opening 31 by means of which a pull rope is attached. When this rope is pulled so as to cause roller 29 to be lifted from pocket 26, the mechanism within members 24 and 25 will be allowed to lock the two members together so the crank will turn until roller 29 enters the other pocket.

As roller 29 enters one of the pockets 26, it engages the adjacent end of a trip arm 32 which acts to disengage the connection between members 24 and 25. Thus, everytime the rope is pulled and then released, clutch member 24 will revolve one half turn and crank 22 will be moved to either its upper or lower position, as illustrated in Figures 1 and 2.

Crank 22 is provided with a link 40 which is operatively connected to the plow frame as follows:

A bar 41 is preferably curved and secured to beam 12 in the position shown by means of brackets 42 and 43. A bracket 44 is slidably mounted on member 41 and is operatively connected to the upper end of member 49 by means of a pin 45, the pin having on its outer end a hub 46. A bar 47 is secured to member 20 at its lower end and slidably projects through an opening in member 46.

The plowing depth is regulated by moving bracket 44 forwardly and rearwardly on member 41 as follows:

A depth lever 50 is pivotally mounted on beam 12 as at 51 and is provided near its rear end with an extension 52 forming a bell crank. A link 53 is pivotally connected to member 52 at its forward end as at 54. The rear bottom edge of member 53 is provided with a number of notches 55.

Bracket 44 is provided with a pin 56 which is suitably flanged and of a diameter whereby one of notches 55 may be caused to engage this pin. A toothed sector 57 is secured to the forward end of beam 12 as at 58. Lever 50 is provided with a dog 59 having a connection to a latch on the free end of the lever (not shown) whereby the operator may release and move the lever to various positions on the sector and thereby move member 44 on bar 41.

Notches 55 are provided in order to make it possible to position the forward end of the lever 50 in a position which will accommodate the extreme range of depth plowed.

It will be seen that the position of bracket 19 will be determined by the position of bracket 44 and when the clutch operates to raise and lower the plow, member 47 will move up and down through hub 46. The object of this device is to insure lever 27 being held at all times in an operating position independent of the position of axle 10.

In Figure 1, bracket 44 is shown in position for deepest plowing and Figure 2 illustrates this bracket in position for shallowest plowing, particularly when lever 50 is in the position shown with link 53 connected to pin 56, as illustrated.

It will be seen that by moving lever 50 back and forth, bracket 44 will be moved back and forth on member 41 and that when the plow is in its lifted or inoperative position, a movement of the lever will not change the height of the plows because when in this position, member 41 is, for its length, on a radius with crank 22. However when the plow is in its operating position, as shown in Figure 2, the wheel will be moved downwardly or upwardly when bracket 44 is moved back and forth on member 41 because of the relative position of the crank to member 41, as illustrated in this figure.

It will be understood that I may dispense with members 19, 20, 46 and 47 in which event, lever 27 may be carried by bracket 14, as indicated by dotted lines in Figure 3, and sleeve 18 will then be rigidly mounted in bracket 14.

Having thus shown and described my invention, I claim:

1. A device of the class described, comprising a frame having ground working means, an L shaped axle, one end being transversely hingedly mounted on said frame, the other end extending forwardly and downwardly and having a bracket secured to the end thereof, a stub axle rotatably mounted in said bracket and having a crank on its inner end, a ground wheel rotatably mounted on the outer end of said stub axle, a two part half turn power lift clutch positioned between said bracket and wheel, one half being secured to said stub axle and the other half secured to the wheel, manually controlled means adapted to cause said two clutch halves to be intermittently locked together and means whereby said crank will move one half turn at each operation, a curved bar mounted on said frame and having a bracket slidably mounted thereon, a link forming an operating connection between said crank and said slidable bracket, a manually operated depth lever having a connection to said slidable bracket with means whereby the bracket may be moved and held in any desired position on the curved bar, said curved bar being positioned substantially on a radius with said crank as a center when the crank is in its upper position relative to said stub axle, said axle bracket having a sleeve rotatably mounted therein into which said stub axle is rotatably mounted, the inner end of said sleeve having rigidly mounted thereon an upwardly extending bar, a hub mounted on said slidable bracket through which said bar slidably extends, an arm on the outer end of said sleeve upon which said manually operated means is hingedly mounted, a spring forming a connection between said manually operated means and said sleeve arm whereby said inner clutch member is normally held in either of its inoperative positions.

2. A device as recited in claim 1 including; said connection between said lever and slidable bracket having spaced means whereby the position of the slidable bracket, relative to the lever, may be manually adjusted.

3. A device of the class described, comprising a frame having ground working means, an L-shaped axle, one end being transversely hingedly mounted on said frame, the other end extending forwardly and downwardly and having a bracket secured to the end thereof, a stub axle rotatably mounted in said bracket and having a crank on its inner end, a ground wheel rotatably mounted on the outer end of said stub axle, a two part half turn power lift clutch positioned between said bracket and wheel, one half being secured to said stub axle and the other half secured to the wheel, manually controlled means carried by said axle adapted to cause said two clutch halves to be intermittently locked together and means whereby said crank will move one half turn at each operation, a curved bar mounted on said frame and having a bracket slidably mounted thereon, a link forming an operating connection between said crank and slidable bracket, a manually operated depth lever having a connection to said slidable bracket with means whereby the bracket may be moved to and held in any desired position on said curved bar, said curved bar being positioned substantially on a radius with said crank as a center when the crank is in its upper position relative to said stub axle.

4. A device of the class described, comprising a frame having ground working means, an L shaped axle, one end being transversely hingedly mounted on said frame, the other end extending forwardly and downwardly and having a bracket secured to the end thereof, a stub axle rotatably mounted in said bracket and having a crank on its inner end, a ground wheel rotatably mounted on the outer end of said stub axle, a two part half turn power lift clutch positioned between said bracket and wheel, one half being secured to said stub axle and the other half secured to the wheel, manually controlled means carried by said axle adapted to cause said two halves to be intermittently locked together and means whereby said crank will move one half turn at each operation, a curved bar mounted on said frame and having a bracket slidably mounted thereon, a link forming an operating connection between said crank and said slidable bracket, a manually operated depth lever having a connection to said slidable bracket with means whereby the bracket may be moved and held in any desired position on said curved bar, said curved bar being positioned substantially on a radius with said crank as a center when the crank is in its upper position relative to said stub axle, said lever connection to said slidable bracket comprising a link having spaced connecting means whereby the position of the slidable bracket relative to the lever may be manually adjusted.

GEORGE ROSS EGO.